Patented July 30, 1929.

1,722,566

UNITED STATES PATENT OFFICE.

CARLETON ELLIS, OF MONTCLAIR, NEW JERSEY.

COMPOSITE RESIN ESTER AND PROCESS OF MAKING SAME.

No Drawing. Application filed December 26, 1922. Serial No. 609,134.

This invention relates to a resinous complex and process of making same involving reacting on rosin or other natural resinous material with phthalic acid or other organic acid in the presence of glycerol with or without catalytic substances present to form a resin ester of a complex nature.

For example 50 parts phthalic anhydride, 33 parts glycerol and 75 parts of rosin (light colored grade) are heated together to a temperature of 250–260° C. During the heating the foaming is considerable and the reaction is facilitated by stirring vigorously. A resinous substance was obtained which was clear and transparent and only slightly darker than the original rosin used. The acid number was 68, 10 parts of glycerol then were added and the mixture heated to about 290° C. The product was slightly darker than the previous sample. The resin was clear and transparent with an acid number of 12.7. It was found to be soluble in benzol and also in hot alcohol but not in cold alcohol. In a mixture of alcohol and benzol or of acetone and benzol the resin is quite soluble.

A series of resins were made in the following proportions using 100 parts of rosin in each case.

|    | Phthalic acid | Glycerol  |
|----|---------------|-----------|
| 1. | 50 parts      | 48 parts  |
| 2. | 30 parts      | 35 parts  |
| 3. | 21 parts      | 24 parts  |
| 4. | 15 parts      | 25 parts  |
| 5. | 9 parts       | 21 parts  |

Agitation was employed in each case as the reaction resulting in the combination of these three substances takes place more rapidly and with less trouble from foaming when a brisk agitation is maintained.

A feature of importance in connection with the utilization of these resins is their property of mixing with nitrocellulose to form good films and this property persists even when the amount of phthalic acid employed in the resin is proportionately small. For example complex resin No. 5 which had an acid number of 12 was difficultly soluble in acetone but easily soluble in acetone-alcohol, acetone-ethyl acetate and ethyl-acetate alcohol mixtures. Equal weights of this ester and nitrocellulose in a mixture of acetone and alcohol gave a fairly good film.

A resin may be made in the following manner: 150 parts by weight of water white rosin, 32 parts phthalic acid and 16 parts glycerol are heated with stirring, the temperature being raised gradually to 290° C. Preferably the rosin, phthalic acid and glycerol are all heated up together or if desired the phthalic acid and glycerol may be first heated together for a short time to expel moisture but without carrying the temperature high enough to form a resin from these two substances. The rosin is introduced prior to that transition. During the heating to 290° C, a considerable amount of water distills off, this commencing at 185° C. In the example in question after 3 hours continuous heating at 185° C. the temperature was lowered to 150° C. and 20 parts additional glycerol were added. At 240° C. the reaction mixture became more viscous and a sharp odor was noticeable at the upper end of the air condenser employed. The heating was discontinued when the temperature reached 290° C. and a greenish colored hard resin was obtained which was found to be soluble in acetone and a mixture of acetone and alcohol. The acid number of this complex is 11. 100 parts of rosin, 15 parts of phthalic anhydride and 25 parts glycerol heated with agitation to 290° C. gave a hard resin of acid number 7.7. It was found to be easily soluble in acetone and in mixtures of acetone and alcohol or ether and alcohol.

Phthalic acid and anhydrid above mentioned are to be regarded as equivalents (due allowance in proportions being made for the water content of the acid which splits off on heating and these are hereinafter embraced in the term "phthalic acid materials."

In carrying out the foregoing procedure either alkali such as quick lime or barium hydroxide or acid such as phosphoric acid may be added if desired. Basic substances such as hydrated lime, zinc oxide, magnesium oxide and the like have a hardening effect by combining with any free rosin acid. The acid number of the final product may be still further reduced by the addition of a basic substance heating until any free resin acid or free organic acid other than resin acid is neutralized.

Shellac also may be employed, for example equal parts phthalic acid, glycerol and shellac are heated to 295° C. the temperature being increased gradually and the mixture being agitated. A dark rather tough resin which is rubbery when warm is obtained.

It softens at 60° C. and fuses between 120-150° C. Mixtures of acetone and alcohol or of ether and alcohol dissolve it readily. It may be blended with nitrocellulose.

A mixture of 75 parts Congo resin, 50 parts of phthalic acid and 35 parts of glycerol was heated gradually in a somewhat similar manner and when reaction was over a dark hard resin was obtained which dissolved partially in acetone.

Other organic acids such as tartaric, citric, malic, succinic and the like may be used to replace the phthalic acid in all or in part.

What I claim is:—

1. A resinous product of low acid number and capable of blending readily with nitrocellulose, prepared from rosin, glycerol and phthalic acid material, the amount of rosin used being in excess of either of the other of said substances.

2. A resinous product of low acid number prepared from rosin, glycerol and phthalic acid, the two latter taken together being less in amount by weight than the rosin, such resinous product being capable of readily blending with nitrocellulose to form a clear film.

3. A resin complex containing the reaction products of a natural acid resin, phthalic acid material and glycerine, having an acid number not substantially above 12.7.

4. A resin complex containing the reaction products of rosin, phthalic acid material and glycerine having an acid number not substantially above 12.7.

5. A process which comprises heating a mixture comprising 100 parts of rosin phthalic acid material chemically equivalent to, about 9 to 50 parts of phthalic acid and about 21 to 48 parts of glycerol to about a temperature at which resinification takes place.

6. A process which comprises heating a mixture comprising 100 parts of rosin phthalic acid material chemically equivalent to, about 50 parts of phthalic acid and about 48 parts of glycerol, to a temperature high enough to effect resinification.

7. A resinous product with an acid number not substantially over 12.7 and capable of blending readily with nitrocellulose, prepared from rosin, glycerol and phthalic acid material, the amount of rosin used being in excess of either of the other of said substances.

8. A resinous product with an acid number not substantially over 12.7 prepared from rosin, glycerol and phthalic acid, the two latter taken together being less in amount by weight than the rosin, such resinous product being capable of readily blending with nitrocellulose to form a clear film.

9. In the production of resins by heat-treating mixtures containing a phthalic acid material and a polyhydric alcohol, the step of reacting with the partly formed ester resin, while the same possesses an undesirably high acid number, with a basic inorganic reagent capable of reducing the said acid number, and continuing the reaction until a product with an acid number not substantially over 12.7, is formed.

10. In the production of resins by heat-treating mixtures containing a phthalic acid material and a polyhydric alcohol, the step of reacting with the partly formed ester resin, while the same possesses an undesirably high acid number, with a basic zinc compound and continuing the reaction until a product with an acid number not substantially over 12.7, is formed.

11. In the production of resins by heat-treating mixtures containing a phthalic acid material and a polyhydric alcohol, the step of reacting with the partly formed ester resin, while the same possesses an undesirably high acid number, with zinc oxide and continuing the reaction until a product with an acid number not substantially over 12.7, is formed.

12. The process of making a resinous complex which comprises simultaneously heating together a natural resin, a polyhydric alcohol, and a polybasic carboxylic acid to produce a resinous complex.

13. The process of making a resinous complex which comprises simultaneously heating rosin, glycerol, and phthalic acid to produce a resinous complex.

14. A resinous reaction complex comprising the reaction product of claim 12.

15. A resinous complex comprising the product of claim 13.

CARLETON ELLIS.